(12) United States Patent
Picot et al.

(10) Patent No.: US 10,988,118 B2
(45) Date of Patent: Apr. 27, 2021

(54) OPTICAL SENSOR SUPPORT PLATE, DELIVERY BODY OF A TELESCOPIC CLEANING DEVICE OF THIS OPTICAL SENSOR, AND QUICK FIXING DEVICE BY CLIPPING THOSE COMPONENTS

(71) Applicant: Valeo Systèmes d'Essuyage, Le Mesnil Saint Denis (FR)

(72) Inventors: Philippe Picot, Issoire (FR); Sébastien Rollet, Issoire (FR); Jordan Vieille, Issoire (FR); Giuseppe Grasso, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 308 days.

(21) Appl. No.: 16/014,457

(22) Filed: Jun. 21, 2018

(65) Prior Publication Data
US 2018/0370499 A1 Dec. 27, 2018

(30) Foreign Application Priority Data
Jun. 22, 2017 (FR) ...................................... 1755707

(51) Int. Cl.
| B60S 1/56 | (2006.01) |
| B60S 1/48 | (2006.01) |
| B60R 11/04 | (2006.01) |
| G02B 27/00 | (2006.01) |
| H04N 5/225 | (2006.01) |
| B08B 3/02 | (2006.01) |
| B60S 1/52 | (2006.01) |
| G01S 17/931 | (2020.01) |
| G01S 7/497 | (2006.01) |

(52) U.S. Cl.
CPC .................. *B60S 1/56* (2013.01); *B08B 3/02* (2013.01); *B60R 11/04* (2013.01); *B60S 1/48* (2013.01); *B60S 1/528* (2013.01); *G01S 17/931* (2020.01); *G02B 27/0006* (2013.01); *H04N 5/2252* (2013.01); *G01S 2007/4977* (2013.01)

(58) Field of Classification Search
CPC .... B60S 1/56; B60S 1/48; B60S 1/528; B60R 11/04; B08B 3/02; H04N 5/2252; G01S 17/931; G01S 2007/4977; G02B 27/0006
See application file for complete search history.

(56) References Cited

U.S. PATENT DOCUMENTS

| 2016/0272163 A1 | 9/2016 | Dreiocker et al. |
| 2017/0015256 A1* | 1/2017 | Henion .................... B60R 1/003 |
| 2017/0080863 A1* | 3/2017 | Henion ..................... B60R 1/12 |

FOREIGN PATENT DOCUMENTS

| DE | 10 2016 107380 A1 | 11/2016 |
| EP | 3121070 A1 | 1/2017 |

OTHER PUBLICATIONS

Preliminary Search Report and Written Opinion issued in corresponding French Application No. 1755707, dated Feb. 12, 2018 (8 pages).

\* cited by examiner

*Primary Examiner* — Benjamin L Osterhout
(74) *Attorney, Agent, or Firm* — Osha Bergman Watanabe & Burton LLP

(57) ABSTRACT

In a device (100) for rapid fixing of a cleaning and/or drying fluid transporting body (6) of a telescopic cleaning device (3) on a support plate (8) for an optical sensor (2) of an optical detection system of a motor vehicle (1), the support plate (8) includes a positioning and orientating interface (12) for a first end (14) of the fluid transporting body (6) and a second locking interface (13, 13') for a second end (15) of the fluid transporting body (6).

13 Claims, 6 Drawing Sheets

Figure 1:
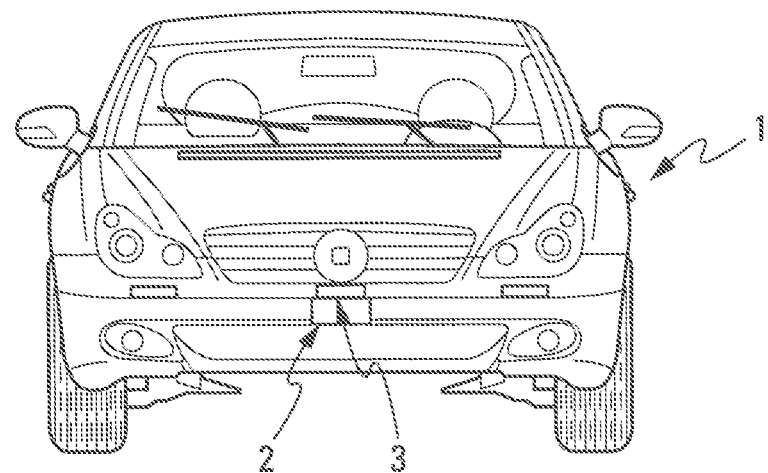

OPTICAL SENSOR SUPPORT PLATE, DELIVERY BODY OF A TELESCOPIC CLEANING DEVICE OF THIS OPTICAL SENSOR, AND QUICK FIXING DEVICE BY CLIPPING THOSE COMPONENTS

The present invention relates to the technical field of optical detection systems intended to be supplied on a motor vehicle and cleaning devices for spraying at least one cleaning and/or drying fluid toward an optical surface, to be cleaned, of an optical sensor of such a detection system. The invention relates more particularly to a support plate of an optical detection system, which support plate is intended to cooperate with a telescopic cleaning device in order to form a device for rapid fixing of the cleaning device with respect to the sensor.

Optical detection system refers to any system including optical sensors such as cameras, laser sensors or other sensors based on the transmission and/or the detection of light in the spectrum which is visible or invisible to humans, in particular infrared.

The function of such optical detection systems is to collect information on the environment of the motor vehicle, in order to provide the driver with assistance for driving and/or manoeuvring this vehicle. For this assistance to be effective, the data provided by the optical detection system must be of the best possible quality, and it is therefore essential to have clean optical sensors in order to carry out these data acquisitions. To this end, a telescopic cleaning device can be arranged in proximity to the optical sensor of the optical detection system and is commanded in order to spray, on an optical surface of the optical sensor, one or more cleaning and/or drying fluids before the detection is carried out. In a known manner such a telescopic cleaning device is fixed on a housing of the optical sensor and includes at least one fluid transporting body formed from a mobile part, made up of a piston accommodated in a jack cylinder and able to move from a retracted rest position to a deployed cleaning position. The transporting body is normally connected, at the rear end thereof, and via a flexible supply conduit, to a tank for storing the cleaning and/or drying fluid(s), and connected at the front end thereof, opposite the rear end thereof, to a device for distributing and spraying the cleaning and/or drying fluid(s). The device for distributing and spraying cleaning and/or drying fluid(s) can include a delivery ramp which extends, symmetrically on either side of the elongation axis of the fluid transporting body in a direction transverse to that of said elongation axis and in which is arranged a set of distributing orifices through which the cleaning and/or drying fluid(s) are sprayed onto the optical surface to be cleaned.

The invention is developed in this context and the aim thereof is to propose an improvement to the existing solutions relating, to the systems for fixing telescopic cleaning devices on optical sensor housings. Thus, the aim of the invention is to propose a support plate for an optical sensor of an optical detection system, which support plate is intended to cooperate via snap-fitting with a fluid transporting body of a telescopic cleaning device in order to form a reliable rapid fixing device, the design cost of which is less.

In the following description, the terms "rear" and "front" refer to the flow direction of the cleaning fluid in the cleaning device, in particular in the fluid transporting body according to the invention. Thus, the term "rear" refers to the side of the transporting body through which this fluid is admitted therein, and the term "front" refers to the side of the transporting body through which the fluid is distributed outside thereof; via a fluid distributing element located in the extension thereof, toward an optical surface of an optical sensor of an optical detection assembly of a motor vehicle. Furthermore, the transverse direction will be understood with respect to the longitudinal direction defined by the elongation main axis of the fluid transporting body.

The first object of the invention is a support plate for an optical sensor of an optical detection system of a motor vehicle including a first face on the optical sensor side and a second opposite face including means for fixing a cleaning and/or drying fluid transporting body of a telescopic cleaning device for the optical sensor. According to the invention, said plate is configured to form, with this fluid transporting body, a rapid fixing device for the telescopic cleaning device. According to the invention, the second face of the support plate includes a positioning and orientating interface for a first part of the fluid transporting body and a locking interface for a second part of the fluid transporting body. The first face is particularly intended to bear the optical sensor.

According to various features of the invention, taken separately or in combination, it is possible to envisage that:
  the positioning and orientating interface includes guiding means and the locking interface includes snap-fit fixing means, which are respectively configured to cooperate with complementary means borne by the transporting body.
  the fluid transporting body includes a first end through which the cleaning and/or drying fluid is admitted therein, and a second end linked to a fluid distributing element, for example a ramp, through which the fluid is distributed outside the fluid transporting body.
  the positioning and orientating interface includes at least a seat for receiving a first part of the transporting body provided by a back wall at the end of a guiding rail, said receiving seat being configured to help form an axis of rotation of said transporting body.
  the positioning and orientating interface which is rigidly connected to the support plate includes a first rear transverse wall, which includes a pair of these guiding rails, particularly arranged symmetrically at each transverse end of the first wall, and a second front transverse wall, providing an abutment face on the upper face thereof, and symmetrical lateral walls which link the walls to one another.
  the guiding means of the positioning and orientating interface can particularly be understood to simultaneously include the pair of guiding rails, the seats provided in these rails and the abutment provided at the top of the second wall.
  the locking interface includes an opening for receiving the second part of the transporting body, with a strut helping to define this opening which bears snap-fit means.
  a strut helping to define the receiving opening bears abutment elements.
  the locking interface is produced by a first transverse strut which forms an abutment element, and for example a pair of abutment elements, by a second transverse strut opposite the first transverse strut and which includes second snap-fit means and by a pair of lateral struts linking the transverse struts to one another and including first snap-fit means, respectively.
  the snap-fit fixing means borne by the locking interface include the first and second snap-fit means.

the abutment elements include an upper face inclined, with respect to the plane defined by the support plate, by an angle less than or equal to 25°, particularly between 10° and 25°.

the first snap-fit means include a base rigidly connected with a lateral strut and from which base a slug projects toward the inside of the opening for receiving the second part of the transporting body.

the second snap-fit means form a tongue protruding from the second transverse strut and including an inclined plane in order to guide, toward the inside of the receiving orifice, the second part of the transporting body.

According to an alternative embodiment, the locking interface comprises a first rear transverse strut which includes a snap-fit means, and a second front transverse strut which includes abutment elements. The locking interface can further include lateral struts which link the transverse at its to one another.

The snap-fit fixing means borne by the locking interface in particular include the snap-fit means. Furthermore, the snap-fit means can have the shape of an annular portion projecting from the opening for receiving the second part of the transporting body, said annular portion defining a central orifice, that is preferably circular.

A second object of the invention relates to a cleaning and/or drying fluid transporting body of a telescopic cleaning device for an optical sensor of an optical detection system of a motor vehicle which can be fixed on a support plate, said body being configured to form, with this plate, a rapid fixing device for the telescopic cleaning device, the cleaning fluid transporting body, forming a revolution about an elongation axis, having a first rear end through which the cleaning fluid is admitted therein, and a second front end linked to a distributing element through which the fluid is distributed outside the fluid transporting body toward an optical surface of the optical sensor. According to the invention, the fluid transporting body includes a first part for positionally guiding the body with respect to the support plate and a second part for snap-fit fixing this body on the plate.

According to a series of features of the invention, which are specific to the first embodiment of the first snap-fit fixing part, it is possible that:

the first position guiding part and the second snap-fit fixing part are substantially aligned along the deployment elongation axis of the telescopic cleaning device.

the first guiding part includes guiding means intended to cooperate with the guiding means of the positioning and orientating interface of the support plate and the second snap-fit fixing part includes snap-fit fixing complementary means configured to cooperate with the snap-fit fixing means borne by the support plate at the locking interface.

the first guiding part includes at least one cylindrical lug, helping to define an axis of rotation of the fluid transporting body.

the first guiding part includes a member for abutment against the rotational movement of the fluid transporting body about the axis of rotation. A tooth in particular forms the abutment member.

the first guiding part includes at least one lateral wall with at least one excess thickness zone forming ribs.

the guiding means are formed at least by a cylindrical lug.

the fluid distributing element is made up of a fluid delivery ramp; the direction of movement of the distributing element from a rest position to a cleaning active position, i.e. the direction of elongation of the cleaning device, is perpendicular to the axis of rotation of the body defined by the at least one cylindrical lug.

the second snap-fit fixing part includes at least one snap-fit complementary means, which is elastically deformable at least in the direction of the telescopic deployment, and at least one abutment.

the abutment, which can consist of a pair of abutments, is intended to bear on the abutment elements of the locking interface that is borne by the support plate; the snap-fit complementary means can take the form of at least first snap-fit complementary means intended to cooperate with the first snap-fit means borne by the locking interface, of a second snap-fit complementary means, which is intended to cooperate with the second snap-fit means of the locking interface.

the first snap-fit complementary means can include an elastically deformable tab that can cooperate with a ramp provided in a strut of the locking interface.

the second snap-fit complementary element can include two elastically deformable arms which define an opening with a shape complementary to that of a slug forming snap-fit means of the locking interface, the arms being flexible to allow the slug to pass into the opening and clamp the slug once in position.

According to an alternative embodiment of the invention, the fixing complementary means are configured to cooperate with a snap-fit means. This snap-fit means can have a central orifice provided in the locking interface of the support plate. The fixing complementary means can thus include a flexible tongue, having a snap-fit head, and a reinforcing bar. Furthermore, the snap-fit head can cooperate, via form fitting, with the central orifice of the locking interface, preferably by having a circular arc shape.

A third object of the invention relates to a device for rapid fixing of a cleaning and/or drying fluid transporting body, as described above, which is supplied on a telescopic cleaning device, on a support plate, as described above, for an optical sensor of a motor vehicle.

In such a rapid fixing device, it is possible to provide, on a second face of the support plate, a first positioning and orientating interface and a second locking interface which are intended to cooperate with a first guiding part and a second snap-fit fixing part of the fluid transporting body.

A lug can form, with a seat of complementary shape, an axis of rotation of the transporting body, in the opposite direction to the snap-fit fixing part.

A fourth object of the invention relates to a method of mounting a cleaning and/or drying fluid transporting body as described above of a telescopic cleaning device on a support plate as described above for an optical sensor of an optical detection system of a motor vehicle, during which at least the following are carried out:

a step for translating the fluid transporting body toward the positioning and orientating interface of the support plate in order to make at least one cylindrical lug of the fluid transporting body cooperate with a receiving rail of this positioning and orientating interface, a step for rotating the fluid transporting body, about the axis of rotation defined by the at least one cylindrical lug, in order to allow the snap-fit fixing means to be brought together and locked.

According to a feature of the invention, the mounting method can comprise, prior to the translation step, at least one step for positioning the at least one cylindrical lug in front of at least one guiding rail (20), in particular of a pair of guiding rails and a step for tilting the fluid transporting body into a pre-assembly position in order to position the lug in a seat formed in the corresponding guiding rail.

Figure 2:
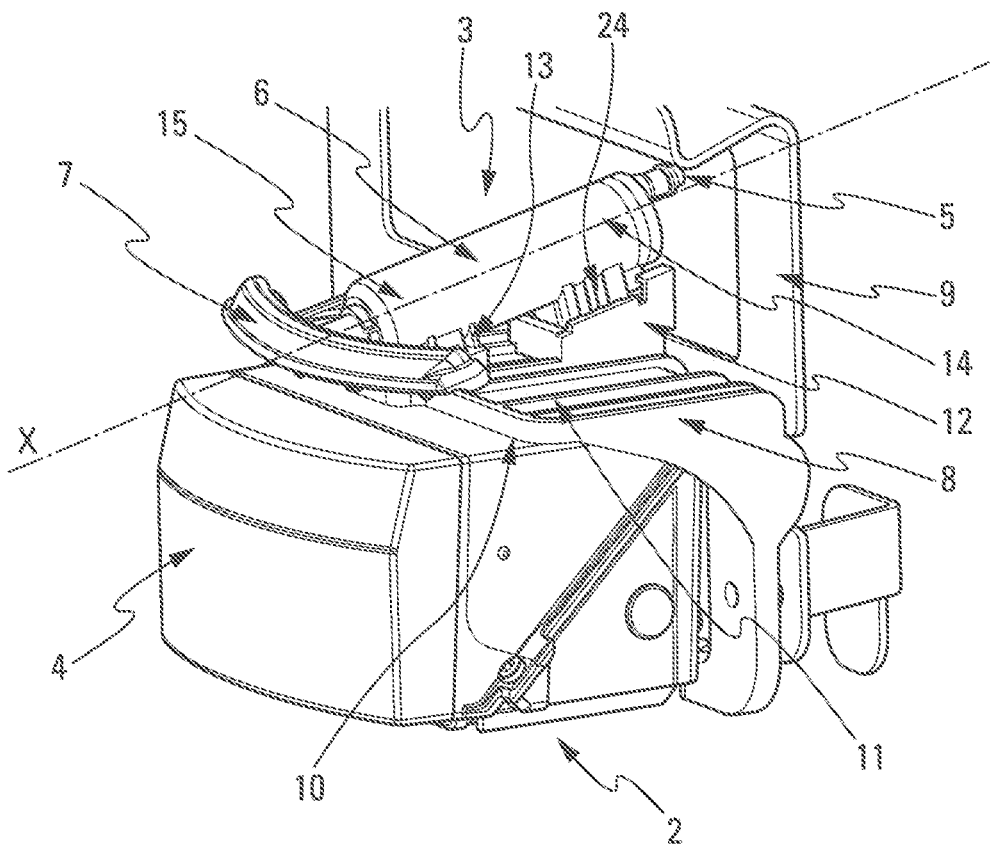
Figure 3:
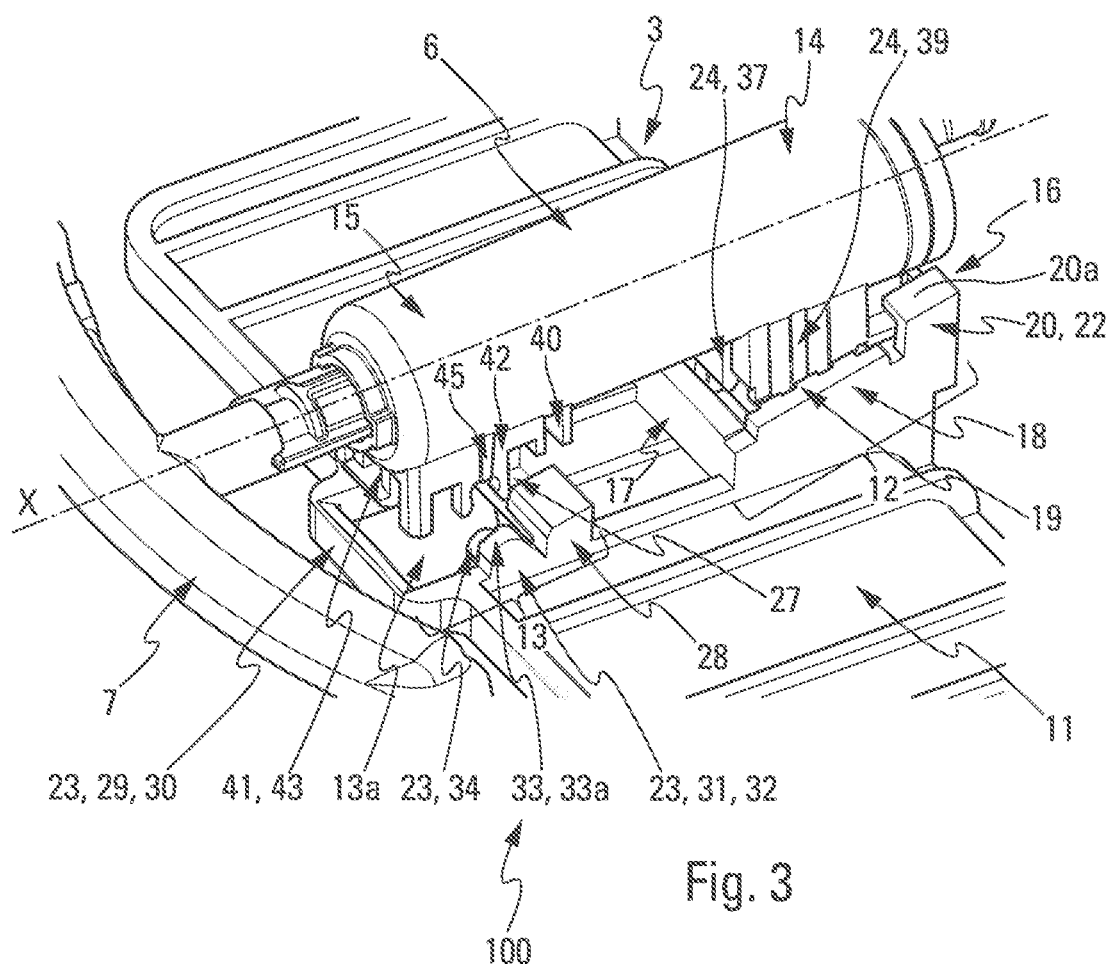
Figure 4:
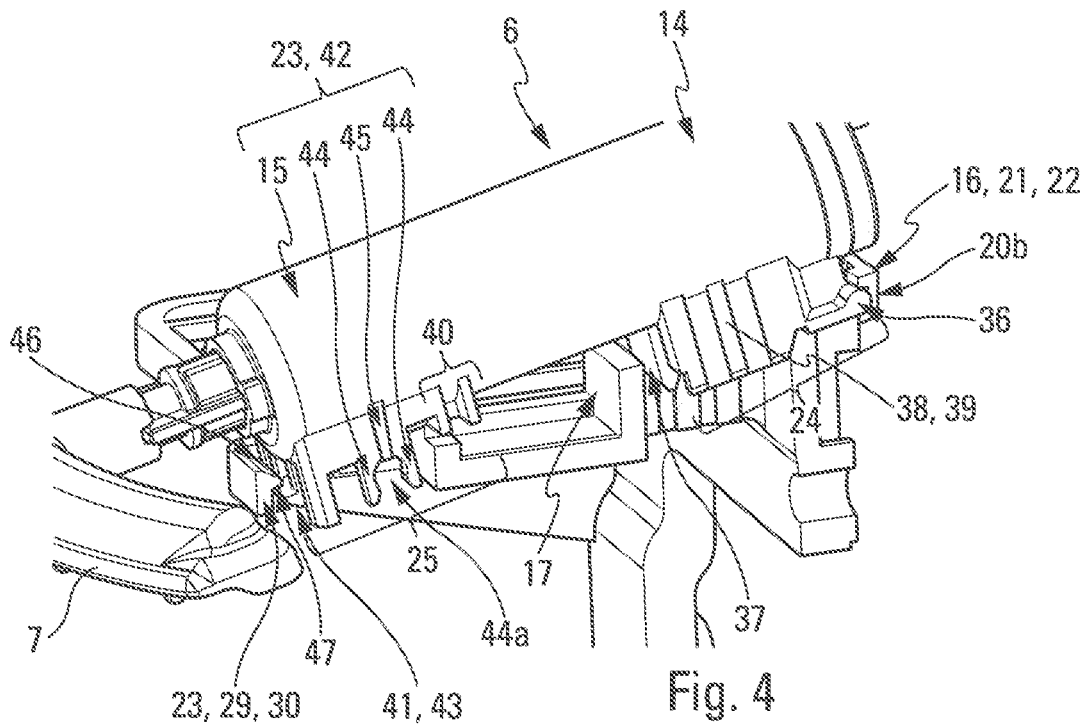
Figure 6:
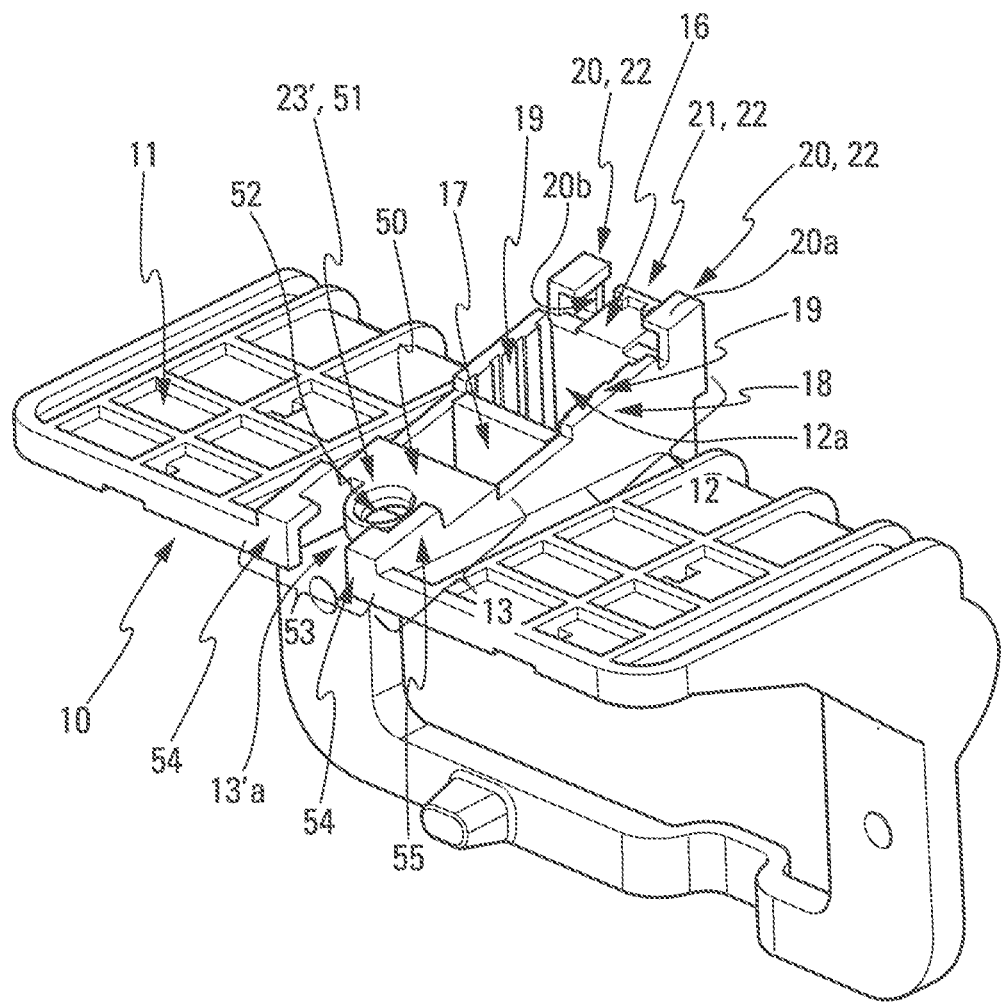
Figure 7:
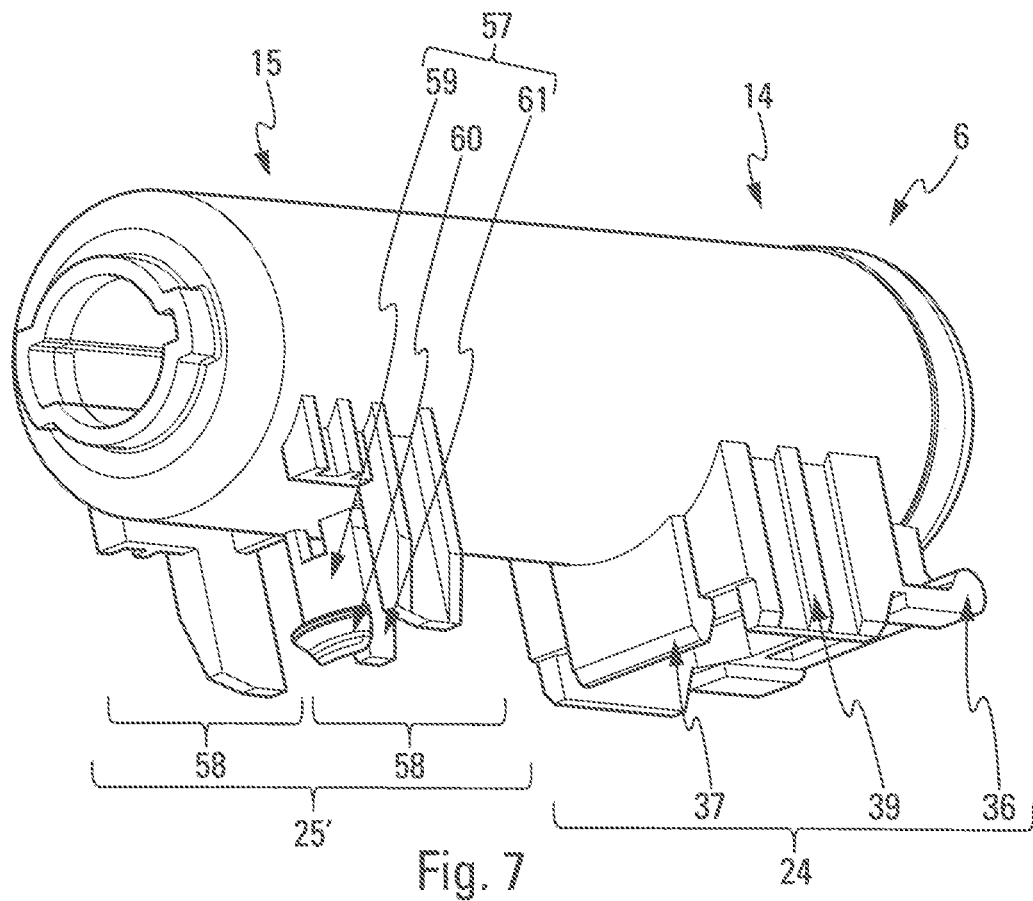
Figure 8:
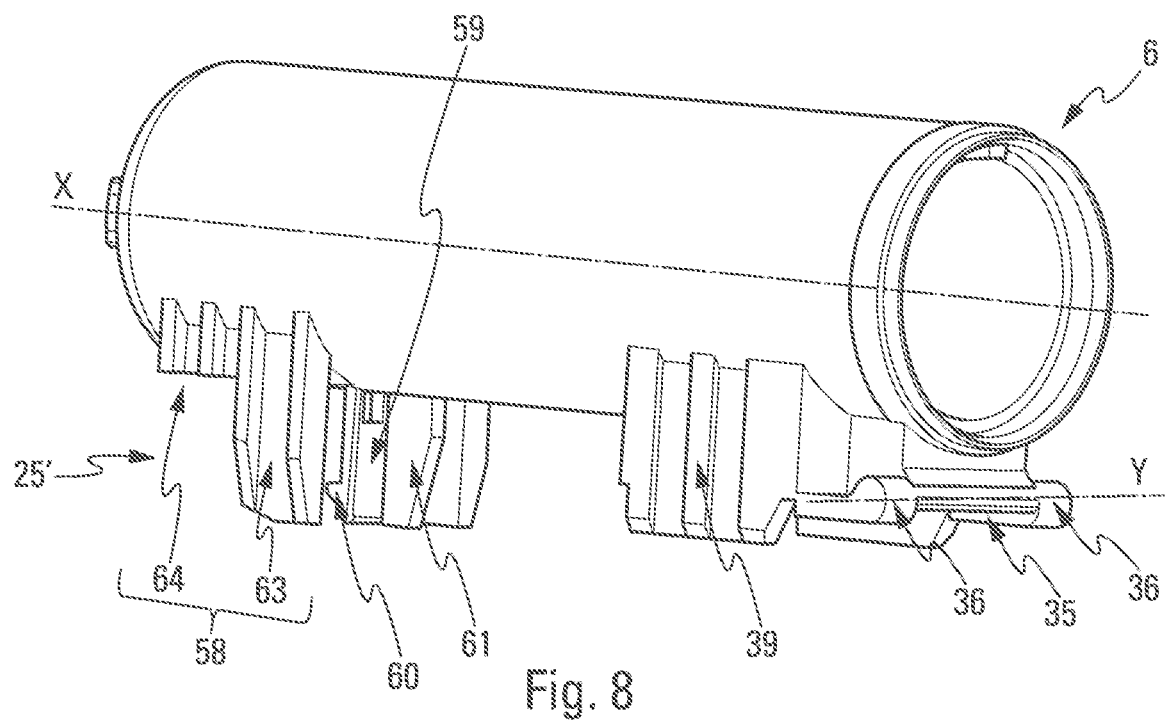
Figure 9:
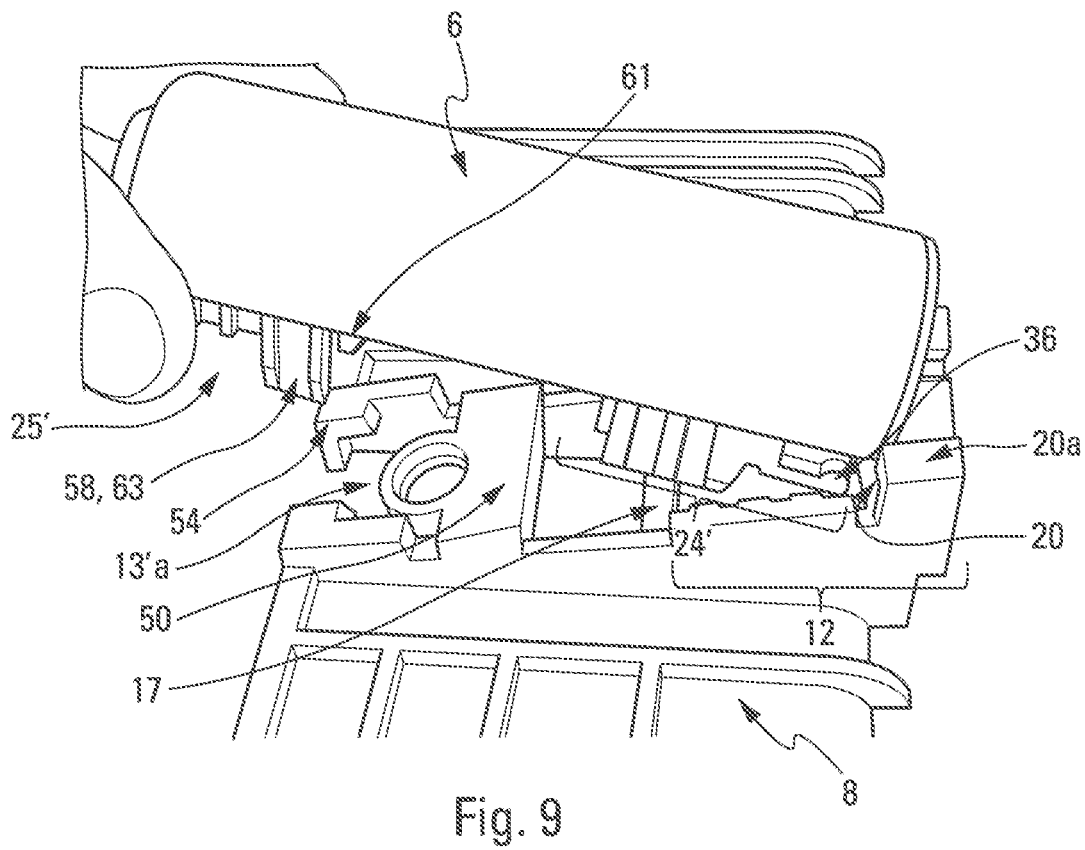
Figure 10:
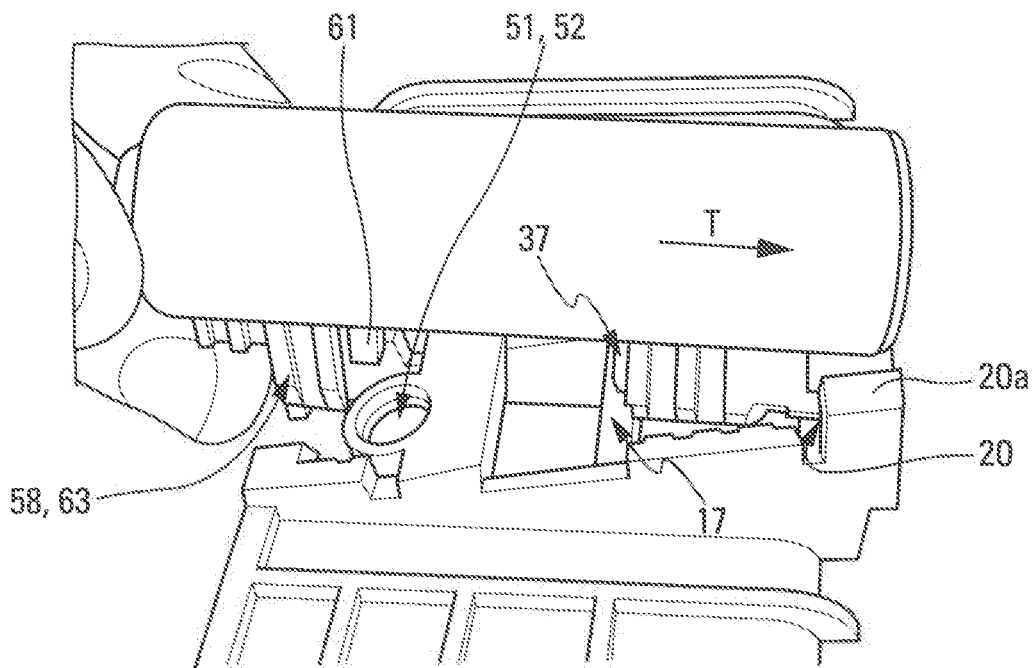
Figure 11:
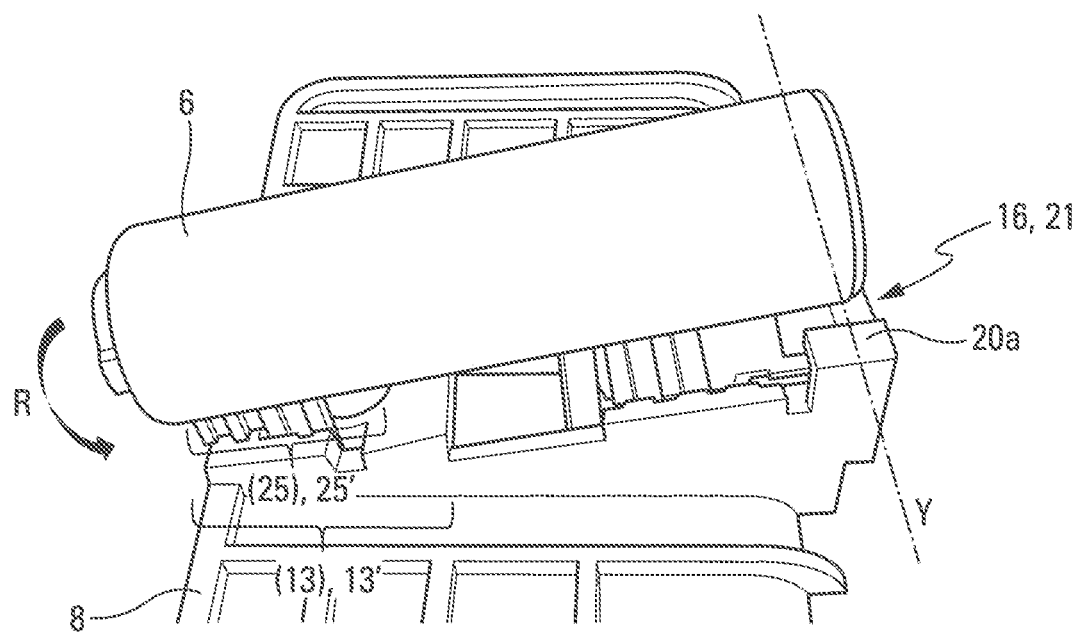
Figures 5, 12:
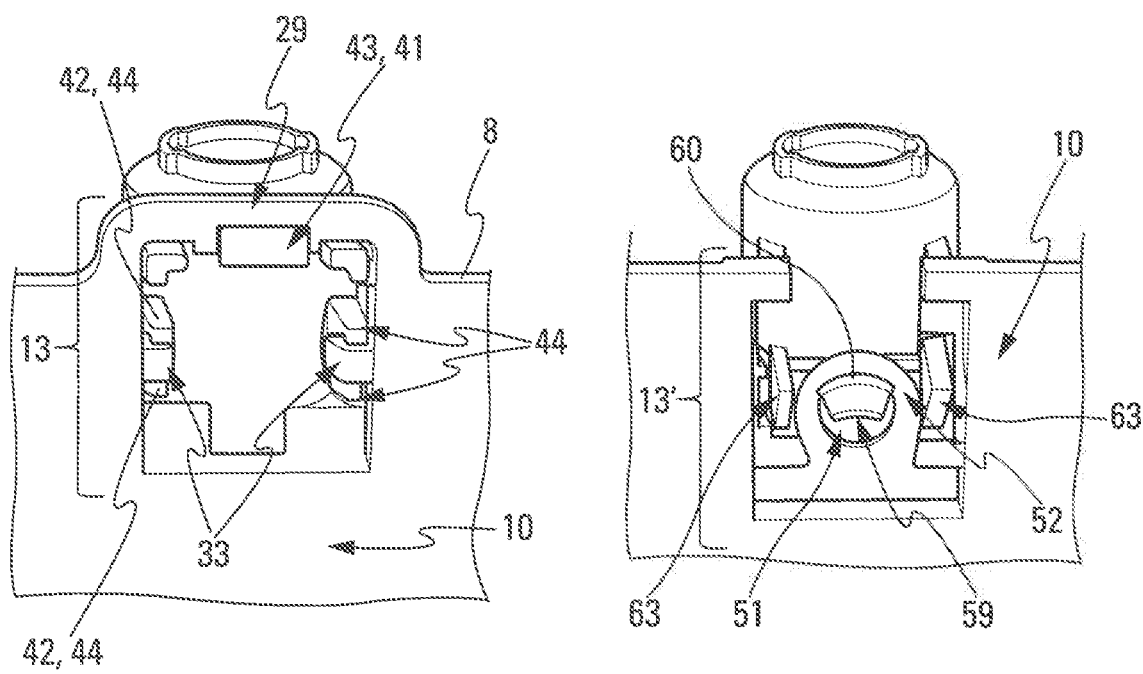

Other features and advantages of the invention will appear more clearly upon reading the detailed description of embodiments of the invention, given hereafter as illustrative and nonlimiting examples and with reference to the appended figures, which illustrate a support plate for an optical sensor of an optical detection system of a motor vehicle, which support plate is intended to cooperate via rapid fixing with a fluid transporting body of a telescopic cleaning device, and wherein:

FIG. 1 is a front view of a vehicle in which there is installed an optical detection system including at least one cleaning device intended to spray at least one cleaning and/or drying fluid toward an optical surface of the optical detection system, FIG. 2 is a perspective view of a first embodiment of the rapid fixing device according to the invention, through which a support plate for an optical sensor of an optical detection system of a motor vehicle cooperates with a cleaning and/or drying fluid transporting body of a telescopic cleaning device including a fluid distributing element at one end, FIG. 3 is a perspective detail view of the rapid fixing device of FIG. 2, in a pre-assembly position of the fluid transporting body with respect to the support plate, FIG. 4 is a perspective detail view of the rapid fixing device of FIG. 2, in an assembly position of the fluid transporting body with respect to the support plate, said support plate having been partially cut away in order to reveal means for positioning and snap-fitting the transporting body, FIG. 5 is a bottom view of the support plate and of the fluid transporting body, in the assembly position, according to the first embodiment of the rapid fixing device illustrated in FIG. 2, showing the cooperation of snap-fit means for the fixing of one upon the other, FIG. 6 is a perspective view of the support plate of a rapid fixing device according to the second embodiment of the invention, FIGS. 7 and 8 are perspective views, front and rear respectively, of a fluid transporting body that can cooperate with the support plate of FIG. 6 for a rapid fixing device according to a second embodiment, FIGS. 9, 10, 11 are side views of the successive steps of the mounting method using the rapid fixing device according to the second embodiment illustrated in FIGS. 6 to 8, FIG. 12 is a bottom view similar to that of FIG. 5 relating to the second embodiment of the rapid fixing device according to the invention.

It should firstly be noted that, if the figures disclose the invention in a detailed manner for the implementation thereof, they can, of course, be used to better define the invention when required. Likewise, it is stated that, for all of the figures, the same elements are designated by the same references.

As will be described hereafter using two different embodiments, the invention relates, at least for one of the aspects thereof, to a device 100 for rapid fixing of a cleaning and/or drying fluid transporting body, notably supplied on a cleaning telescopic device for an optical sensor of a motor vehicle, on a support plate for this sensor. It will be understood that the embodiments of the invention that are illustrated by the figures are given by way of nonlimiting example. Consequently, other configurations of the rapid fixing device according to an aspect of the invention can be produced, particularly by variation of the arrangement and of the sizing of a positioning interface and of a locking interface that make up the support plate and of a guiding part and of a snap-fit fixing part that make up the cleaning and/or drying fluid transporting body which are made to cooperate according to the invention in order to form a rapid fixing device.

It is also recalled that, in the following description, the terms "rear" and "front" refer to the flow direction of the fluid in the telescopic cleaning device, in particular in the cleaning and/or drying fluid transporting body according to the invention. Thus, the term "rear" refers to the side of the fluid transporting body through which this fluid is admitted therein, and the term "front" refers to the side of the fluid transporting body through which the fluid is distributed outside thereof via a distributing element located as a continuation thereof, toward a surface of an optical sensor of an optical detection assembly of a motor vehicle. Thus, it is considered that the positioning and orientating interface of the support plate and the first end of the fluid transporting body are located at the rear of the rapid fixing device according to the invention and that the locking interface of the support plate and the second end of the fluid transporting body are located at the front of the rapid fixing device according to the invention.

Furthermore, according to a conventional arrangement of the invention, it is considered that the first face of the support plate, intended to bear the optical sensor, is the lower face of the support plate and that the opposite second face, intended to cooperate with the fluid transporting body according to the invention, is the upper face of said support plate.

FIG. 1 illustrates a vehicle 1 including an optical detection system which is part of a driver assistance system, this optical detection system including in this case, at the front face of the vehicle 1, an optical sensor 2 and a cleaning device 3. The detection assembly is, in this case, arranged on the front face of the vehicle, particularly at the grill.

FIG. 2, illustrates the cleaning device 3, arranged in proximity to an optical surface 4 of an optical sensor 2 borne by the lower first face 10 of a support plate 8.

The assembly formed in this manner by the telescopic cleaning device 3, the support plate 8 and the optical sensor 2 is borne by a support plate 9 which in this case is assembled by screwing onto the vehicle 1.

The telescopic cleaning device 3 is made up, mainly, from the rear toward the front along an elongation longitudinal axis X of the cleaning device 3, of a fluid admission port 5, of a cleaning and/or drying fluid transporting body 6, forming a revolution about the elongation axis X, and of a fluid distributing element 7, in this case made up of a delivery ramp.

The fluid transporting body 6 is fixed on an second upper face 11 of the support plate 8 by cooperation of a first rear end 14 with a positioning and orientating interface 12 of the support plate and by cooperation of a second front end 15 with a locking interface 13, 13' of this support plate (as can be seen in FIGS. 3 and 6).

The distributing element 7 is borne at the end of a mobile piston (not visible) configured to slide inside the fluid transporting hollow body 6 between a deployed position and a retracted position, such that the distributing element 7 can consequently assume a cleaning position in which it is deployed in front of the optical surface 4 to be cleaned, the distributing nozzles of the distributing element 7 being orientated such that the cleaning fluid is sprayed onto the optical surface 4, and a withdrawn position, that can be seen in FIG. 2, in which the distributing element 7 is protected and does not hinder detection by the optical sensor 2.

A first embodiment of the rapid fixing device 100 according to the invention will now be described in greater detail, by referring to FIGS. 3 to 5.

FIG. 3 illustrates this device in a position for pre-assembly of the fluid transporting body 6 on the second upper face 11 of the support plate 8.

The second face 11 of the support plate 8 includes a positioning and orientating interface 12 and a locking interface 13, which are arranged one behind the other along a direction parallel to the elongation axis X of the cleaning device 3.

The positioning and orientating interface 12 can cooperate with a first guiding part 24 (visible in FIG. 4) arranged on an outer face of the fluid transporting body 6, at the rear first end 14 thereof. The locking interface 13 can cooperate with a second snap-fit fixing part 25 (visible in FIG. 4) arranged on this same outer face of the fluid transporting body 6, this time at the second front end 15.

The positioning and orientating interface 12 has the form of a frame, substantially rectangular, produced by a first rear transverse wall 16, by a second front transverse wall 17 arranged parallel with the first wall 16, and by a pair of symmetrical lateral walls 18 which each include, on each inner face, at least one excess thickness zone 19 forming ribs, in this case three excess thickness zones. An opening 12a is defined inside the frame between these four walls.

The first transverse wall 16 includes, at each lateral end, a position guiding rail 20, each rail 20 being defined in the direction away from the support plate 8 by a shoulder 20a and by a wall 20b having a circle portion profile, forming a seat for a cylindrical lug which is rigidly connected to the transporting body 6 as will be described hereafter. Two rails 20 are arranged symmetrically at the lateral ends of the first transverse wall 16, being separated by a central abutment shaft 21.

The pair of position guiding rails 20 and the central abutment shaft 21 make up the guiding means 22 of the positioning and orientating interface 12, which are configured to cooperate with the first guiding part 24 (visible in FIG. 4) borne on the outer wall of the first rear end 14 of the fluid transporting body 6.

As can be seen in FIG. 2, the height of the second front transverse wall 17, i.e. the dimension of this wall projecting from the second face 11 of the support plate 8, is less than the height of the first rear transverse wall 16 (visible in FIG. 6) such as to give the lateral walls 18 of the positioning and orientating interface an inclination of angle alpha (α), less than or equal to 25°, particularly between 10° and 25°, and for example equal to 15°, with respect to a plane defined by the support plate 8. Considering that this support plate 8 is rigidly connected to the sensor and allows the transporting body to be fixed, it is thus possible to ensure, in the assembly position, a determined inclination of the elongation axis X and therefore of the deployment of the distributing element 7 with respect to the plane of the support plate 8 and therefore an optimum distributing position with respect to the optical surface 4.

The locking interface 13 which is rigidly connected to the support plate 8 includes snap-fit fixing means 23 for the second end 15 of the fluid transporting body 6. More particularly, the locking interface 13 forms a frame, substantially square, inside which an opening 13a is configured to receive the second fixing part 25, this opening 13a being defined by a first rear transverse strut 27, by a second front opposite transverse strut 29 and by a symmetrical pair of lateral struts 31.

Each of the lateral struts 31 include, on at least a portion of the inner face thereof, first snap-fit means 32 formed from a base 33 hollowed from the top thereof with a vertical groove 33a and which extends as far as a slug 34, cylindrical with a circular section and protruding from the base in order to extend toward the centre of the frame formed by the locking interface 13.

The first rear transverse strut 27 includes at least one abutment element 28, in this case two abutment elements placed symmetrically at each transverse end of the first transverse strut 27, the upper face of which, i.e. the face facing away from the support plate 8, is inclined with respect to the plane of this plate. Advantageously, the inclination of this upper face of the abutment element has an angle equivalent to that which has been described above, namely an angle alpha (α), less than or equal to 25°, particularly between 10° and 25°, and for example equal to 15°, with respect to a plane defined by the support plate 8. In an alternative that is not illustrated, the angle alpha (α) is zero.

The second front transverse strut 29 includes second snap-fit means 30 formed from a tongue extending toward the centre of the frame formed by the locking interface, the tongue having a shape of a ramp 46 on the upper face thereof and a straight plane 47, perpendicular to the second transverse strut 29 on the lower face thereof (visible in FIG. 5).

It is understood that, in this configuration, the snap-fit fixing means 23 borne by the locking interface 13 are made up of the first 32 and second 30 snap-fit means.

As can be particularly seen in FIGS. 3 and 4, the fluid transporting body 6 according to the first embodiment includes a first guiding part 24 configured to cooperate with the guiding means 22 of the positioning and orientating interface 12 of the support plate 8 and a second snap-fit fixing part 25 configured to cooperate with the snap-fit fixing means 23 borne partially by the locking interface 13 of the support plate 8.

The first guiding part 24 forms a block, substantially rectangular, defined by a rear transverse branch 35 (reference can be made for example to FIG. 8 illustrating a second embodiment but in which the transverse branch 35 is substantially the same), a front transverse tooth 37 and a pair of symmetrical lateral branches 38 which include, on each outer face, at least one excess thickness zone 39 forming ribs, in this case three excess thickness zones, which is suitable for cooperating with at least one excess thickness zone 19 of the pair of lateral walls 18 of the positioning and orientating interface 12 such as to mount, when passing from the pre-assembly position to the assembly position, the fluid transporting body 6 on the positioning and orientating interface 12 in a "tight fit" manner.

The rear transverse branch 35 bears, at each transverse end, a cylindrical lug 36, these lugs being respectively suitable for cooperating with one of the position guiding rails 20 of the positioning and orientating interface 12 of the support plate 8. It will be possible to describe hereafter how each lug is made to cooperate with the corresponding rail in order to assume position in the seat formed by the back wall 20b and form an axis of rotation about which the body 6 can rotate in order to pass from the pre-assembly position to the assembly position. It will be described in particular how, to this end, the rear transverse branch 35 which is rigidly connected to the fluid transporting body 6 is positioned against the central abutment shaft 21 formed in the positioning and orientating interface 12 of the support plate 8.

The transverse tooth 37 projects from the transporting body 6 in order to hear on the second front transverse wall 17 of the positioning and orientating interface 12 during the rapid fixing of the body 6 on the support plate, until the lugs 36 are correctly pressed into the position guiding rails 20, a position in which the transverse tooth 37 engages the opening 12*a* formed inside the frame formed by the positioning and orientating interface 12.

The pair of cylindrical lugs 36 and the branch 35 form guiding means 26 of the first guiding part 24 which cooperate with the guiding means 22 of the positioning and orientating interface 12 of the support plate 8 which are made up of the pair of position guiding rails 20 and of the central abutment shaft 21.

As has been stated above, the lugs 36 have a cylindrical form that complements that of the seats firmed by the back walls 20*b* of each rail 20, such that the lugs when they are accommodated in the corresponding seat, define an axis of rotation of the fluid transporting body 6, in the zone of the positioning and orientating interface 12, which allows said fluid transporting body 6 to be tilted in order to snap-fit the snap-fit fixing means 23 borne by the locking interface 13 of the support plate 8 with the second snap-fit fixing part 25 of the fluid transporting body 6.

The second snap-fit fixing part 25 includes a symmetrical pair of rear transverse angular abutments 40, which can bear on the symmetrical pair of abutment elements 28 of the locking interface 13, first snap-fit lateral complementary means 42 suitable for cooperating with the first snap-fit means 32 of the locking interface 13 and a second front transverse snap-fit complementary means 41 suitable for cooperating with the second snap-fit means 30 of the locking interface 13.

In this configuration, the first and second complementary means 41, 42 form snap-fit fixing complementary means suitable for cooperating with the snap-fit fixing means 23 borne by the locking interface 13 which is rigidly connected to the support plate.

The first snap-fit lateral complementary means 42 each include two elastically deformable arms 44 arranged to assume the shape of a fork and define an opening 44*a* with a shape complementary to that of the slug 34. The free end of the elastically deformable arms 44 has a boss, the aim of which is to reduce the passage section of the opening 44*a*, such that when the transporting body 6 is tilted toward the assembly position thereof, the arms 44 are moved apart from one another by contact against the slug 34, until this slug is accommodated in the opening 44*a* and the arms, by assuming again the original shape thereof, retain the slug 34 in the opening 44*a* and help to immobilize the position of the body 6 with respect to the support plate 8. As illustrated in FIGS. 3 and 4 in particular, a rib 45 forms an excess thickness of a lateral wall arranged in line with these first snap-fit complementary means 42 and this rib is configured to slide into the vertical groove 33*a* when snap-fitting the complementary means.

The second front transverse snap-fit complementary means 41 form a snap-fit additional means, in order to properly fix the assembly, particularly in the case of breakage of the arms 44 of the first complementary means. It includes, in particular, a tab 43 elastically deformable on contact with the ramp 46 formed in the locking interface 13. The tab 43 has, at the free end thereof, a head wherein the face facing away from the transporting body, i.e. the face made to enter into contact with the ramp 46 when the body 6 is pivoted, has an inclined plane, and which furthermore has a blocking planar surface made to cooperate with the straight plane 47 of the tongue of the second snap-fit means 30 borne by the locking interface 13. As has just been specified, the function of this second snap-fit complementary means 41 is to reinforce the locking of the rapid fixing device 100 according to an aspect of the invention, by helping to maintain the snap-fit regardless of the direction of the effort applied on the fluid distributing element 7.

A description will now be given of a second embodiment of the rapid fixing device according to an aspect of the invention, by referring to FIGS. 6-12.

The rapid fixing device which will be described in this case differs from the first embodiment described above particularly through the arrangement of the locking interface 13' extending from the second face 11 of the support plate 8 (visible in FIG. 6) and through the corresponding arrangement of the second snap-fit fixing part 25' (visible in FIGS. 7 and 8) borne on the outer wall of the second front end 15 of the fluid transporting body 6, given that, as above, the locking interface 13' is suitable for cooperating with said second snap-fit fixing part 25'. The first positioning and orientating interface 12 remains identical in this case from the first to the second embodiment.

In this second embodiment, as is visible in FIG. 6, the locking interface 13' also forms, in this case, a frame defining, therein, an opening 13*a*' for receiving the second fixing part 25'. In this case, the interface includes a first rear transverse strut 50, a second front opposite transverse strut 53 and a symmetrical pair of lateral struts 55. In this case, it is the first rear transverse strut 50 which bears the snap-fit means. In the illustrated example of this second embodiment, only a single snap-fit means 51 is provided. Furthermore, in this case it is the second front transverse strut 53 which includes, at the transverse ends thereof a symmetrical pair of abutment elements 54, which extend and widen the lateral struts 55 toward the front.

It should be noted that the front transverse strut 53 is, in this case, partially hollowed at the centre thereof. This hollowing facilitates the positioning of the body 6 while allowing a saving in material.

In accordance with what has been described above, the abutment elements 54 and the lateral struts 55 have upper faces inclined by an angle alpha ($\alpha$), less than or equal to 25°, particularly between 10° and 25°, with respect to a plane defined by the support plate 8, such as to allow, in the assembly position, an optimum inclination of the fluid transporting body 6 and therefore of the distributing element 7 with respect to the optical surface 4. The angle alpha ($\alpha$) is, for example, equal to 15° as illustrated.

In the configuration of the example illustrated in FIG. 6, the snap-fit fixing means 23' borne by the locking interface 13' of the support plate 8 are made up of the snap-fit means 51.

As illustrated, the snap-fit means 51 projects from the front edge of the first rear transverse strut 50 such as to extend into the opening formed at the centre of the frame of the locking interface 13' and it has the shape of a partially annular projection which defines, at the centre thereof, a central orifice 52, which is circular in this case.

In this second embodiment, as is visible in FIGS. 7 and 8, the second snap-fit fixing part 25' includes snap-fit fixing complementary means 57, which are intended to cooperate with the snap-fit means 51 of the locking interface 13', and legs 58 which extend from the transporting body 6, transversally on either side of the fixing complementary means 57, these legs 58 being suitable for cooperating simultaneously with the abutment elements 54 of the locking interface 13' and with the lateral struts 55 of this locking interface.

In this configuration, the complementary means 57 form snap-fit fixing complementary means suitable for cooperating with the snap-fit fixing means 23' borne by the locking interface 13' which is rigidly connected to the support plate.

The fixing complementary means 57 include a flexible tongue 59, which has, at the free end thereof, a snap-fit head 60, as well as a reinforcing bar 61, the height of which is furthermore dimensioned to form an abutment against the first rear transverse strut 50.

The snap-fit head 60 has an annular portion complementary to that of the central orifice 52 of the snap-fit means 51, and it has an inclined plane on a face directed away from the transporting body 6 and a straight plane on the other face such as to be elastically deformed in order to pass inside the central orifice, then to again assume the original shape thereof and positionally block the transporting body with respect to the support plate 8. In other words, the flexible tongue 59 is suitable for being elastically deformed in the direction of the reinforcing bar 61 in order to allow the insertion of the fixing complementary means 57 into the corresponding central orifice 52.

The legs 58 include a large dimension portion forming a first positioning leg 63, which is intended to cooperate with a lateral strut 55 of the locking interface 13', and a small dimension portion forming a second positioning leg 64 which is suitable for bearing on an abutment element 54 of the locking interface 13'. As illustrated, each first leg 63 can include, at the free end thereof, a bevelled part forming an insertion ramp in order to facilitate the passage of the first legs inside the opening of the frame formed by the locking interface 13' when the transporting body is tilted into the assembly position. In this position, it is understood that the first legs bear against the internal face of the lateral struts running alongside the opening of the frame and that the second legs bear on the upper face of the front transverse strut.

FIGS. 9, 10, 11 and 12 illustrate the steps of the method for mounting the rapid fixing device 100 according to the second embodiment and particularly show the positions for pre-assembly and assembly of the cleaning and/or drying fluid transporting body 6 with respect to the support plate 8.

Although the mounting method will be described in this case by referring to an illustration of the second embodiment of the rapid fixing device, it should be noted that it includes, up to the locking assembly final step, steps which are common to both the embodiments described above.

These common steps consist successively in a first step of positioning the body 6, in a second step of tilting this body with respect to the support plate, in a third step of translating the body into appropriate guiding means borne by the support plate and in a fourth step of rotating the body in order to make the snap-fit means cooperate.

The first step consists in positioning the first guiding part 24 of the fluid transporting body 6 with respect to the positioning and orientating interface 12 projecting from the second face 11 of the support plate 8. This step (visible in FIG. 9) particularly consists in positioning the cylindrical lugs 36 of the first guiding part 24 at the inlet of the corresponding position guiding rail 20 provided on the positioning and orientating interface 12 of the support plate 8.

The second step consists in tilting the fluid transporting body 6 into a pre-assembly position (visible in FIG. 10), in order to bring the transverse tooth 37 which is rigidly connected to the fluid transporting body 6 to bear on the second front transverse wall 17 of the support plate 8. The height of this tooth 37 is configured such that, in the pre-assembly position, the cylindrical lugs 36 can be inserted into the corresponding rail 20 thereof, by passing under the shoulder 20a.

The third step consists in translating, toward the rear of the support plate 8, the fluid transporting body 6 into an abutment position. This step (visible in FIG. 10) consists more precisely in translating the lugs 36 via linear sliding inside the corresponding rail 20 until the rear transverse branch 35 of the first guiding part 24 of the fluid transporting body 6 abuts against the central abutment shaft 21 which is rigidly connected to the positioning and orientating interface 12 of the support plate 8, such that, inside each rail, the lugs 36 are accommodated in the complementary cylindrical seat formed by the back wall 20b. In this translation final position, the snap-fit fixing means, borne by the second fixing part 25 of the transporting body 6 and by the locking interface 13' of the support plate 8 are brought to face one another.

The fourth step consists in rotating the fluid transporting body 6, about the axis of rotation Y defined by the cooperation of the cylindrical lugs 36 in the corresponding seat formed by the back wall 20b of the slide 20, in order to make the locking interface 13' of the support plate 8 cooperate with the second snap-fit fixing part 25' of the fluid transporting body 6 and to make the transporting body 6 and the support plate 8 take a final assembly position.

It should be noted that, in this assembly final position, the ribs 19, 39, produced in a complementary manner on the lateral walls and branches of the positioning interface and of the first guiding part, allow the position of the assembly to be held, by tight fit.

It is understood from the above that the snap-fit locking final step differs depending on Whether the rapid fixing device is in accordance with the first or the second embodiment of the invention.

FIG. 5 illustrates the final position for assembly of the rapid fixing device 100 according to the first embodiment of the invention wherein the second fixing part 25 cooperates with the locking interface 13 of the support plate 8.

In particular, the first snap-fit lateral complementary means 42 and the second transverse snap-fit complementary means 41 are engaged on the first 32 and second 30 snap-fit means forming the fixing means 23 of the locking interface 13.

As was able to be described above, the rotation generated about the axis of rotation Y in this final locking step is permitted by the elastic deformation of the arms 44 of the first snap-fit complementary means 42 on contact with the slug 34, the arms then clamping the slug 34, and by the elastic deformation of the tab 43 elastically deformable on contact with the ramp 46, the tab 43 then preventing the vertical release of the transporting body 6 with respect to this locking interface 13. In this manner, the rapid fixing device 100 makes it possible, according to the invention, to produce snap-fit reliable fixing regardless of the direction of the effort applied to the fluid distributing element 7.

In this assembly final position, the symmetrical pair of abutments 40 of the second fixing part 25 bears on the abutment elements 54 of the locking interface 13, the upper faces of which are inclined by an angle alpha ($\alpha$) less than or equal to 25°, particularly between 10° and 25°, and in particular equal to 15°, with respect to a plane defining the support plate 8, moreover bearing the optical sensor 2. In this manner, it is possible to position the fluid transporting body 6 and to ensure that the deployment of the distributing element 7 which is attached thereto allows spraying of cleaning fluid onto the optical surface 4 with a desired spraying angle.

FIG. 12 illustrates the final position for assembly of the rapid fixing device 100 according to the second embodiment of the invention wherein the second fixing part 25' of the fluid transporting body 6 cooperates with the locking interface 13' of the support plate 8.

In particular, the fixing complementary means 57 are engaged with the snap-fit means 51 forming the snap-fit fixing means 23' of the locking interface 13'.

As was able to be described above, the rotation generated about the axis of rotation Y in this locking final step is allowed by the elastic deformation of the flexible tongue 59 on contact with the wall defining the central orifice 52 arranged through the opening of the locking interface 13', this wall being bevelled inwardly in order to facilitate the guiding of the tongue into the central orifice, the flexible tongue 59 then preventing the vertical release of the transporting body 6 with respect to this locking interface 13. The angular range of this flexible tongue 59 makes it possible to produce snap-fit reliable fixing regardless of the direction of the effort applied to the fluid distributing element 7.

In this assembly final position, the second positioning legs 64 bear on the abutment elements 54 of the locking interface 13', the upper faces of which are inclined, from the front toward the rear, by an angle alpha ($\alpha$), less than or equal to 25°, particularly between 10° and 25°, for example equal to 15°, with respect to a plane defining the support plate 8, moreover bearing the optical sensor 2. In this manner, it is possible to position the fluid transporting body 6 and to ensure that the deployment of the distributing element 7 which is attached thereto allows spraying of cleaning fluid onto the optical surface 4 with a desired spraying angle.

The invention cannot be limited to the embodiments specifically given in this document as nonlimiting examples, and particularly extends to all equivalent means and to any technically effective combination of these means.

The invention claimed is:

1. A support plate for an optical sensor of an optical detection system of a motor vehicle, comprising:
   a first face on the optical sensor side; and
   a second face located opposite to the first face and including means for fixing a cleaning and/or drying fluid transporting body of a telescopic cleaning device for the optical sensor,
   wherein said support plate is configured to form, with the cleaning and/or drying fluid transporting body, a rapid fixing device for the telescopic cleaning device, and
   wherein the second face of the support plate includes a positioning and orientating interface for a first part of the cleaning and/or drying fluid transporting body and a locking interface for a second part of the cleaning and/or drying fluid transporting body.

2. The support plate according to claim 1, wherein the positioning and orientating interface includes at least a seat for receiving the first part of the cleaning and/or drying fluid transporting body provided by a back wall at an end of a guiding rail, said receiving seat being configured to help form an axis of rotation of said cleaning and/or drying fluid transporting body.

3. The support plate according to claim 1, wherein the locking interface includes an opening for receiving the second part of the cleaning and/or drying fluid transporting body, with a first strut helping to define the opening and which bears snap-fit means.

4. The support plate according to claim 3, wherein a second strut defines the opening for receiving and bears abutment elements.

5. The support plate according to claim 4, wherein the abutment elements include an upper face that is inclined with respect to a plane defined by the support plate by an angle less than or equal to 25°.

6. A cleaning and/or drying fluid transporting body of a telescopic cleaning device for an optical sensor of an optical detection system of a motor vehicle configured to be fixed on a support plate,
   said cleaning and/or drying fluid transporting body being configured to form, with the support plate, a rapid fixing device for the telescopic cleaning device,
   the cleaning and/or drying fluid transporting body extending along an elongation axis, having a first end located at a rear through which cleaning fluid is admitted therein, and a second front located at a front linked to a distributing element through which the cleaning fluid is distributed outside the cleaning and/or drying fluid transporting body toward an optical surface of the optical sensor,
   wherein the cleaning and/or drying fluid transporting body includes a first part for positionally guiding the cleaning and/or drying fluid transporting body with respect to the support plate and a second part for snap-fit fixing the cleaning and/or drying fluid transporting body on the support plate.

7. The cleaning and/or drying fluid transporting body according to claim 6, wherein a first position guiding part and the second part for snap-fit fixing are substantially aligned along the elongation axis of the telescopic cleaning device.

8. The cleaning and/or drying fluid transporting body according to claim 6, wherein the first position guiding part includes at least one cylindrical lug defines an axis of rotation of the cleaning and/or drying fluid transporting body.

9. The cleaning and/or drying fluid transporting device according to claim 8, wherein the first position guiding part includes a member for abutment against a rotational movement of the cleaning and/or drying fluid transporting body about the axis of rotation.

10. The cleaning and/or drying fluid transporting body according to claim 6, wherein the second part includes at least one snap-fit complementary means, which is elastically deformable in a direction of the telescopic cleaning device, and at least one abutment.

11. A device for rapid fixing of a cleaning and/or drying fluid transporting body as claimed in claim 6, supplied on the telescopic cleaning device, on the support plate for the optical sensor of the motor vehicle, the support plate having a first face on the optical sensor side, and a second face located opposite to the first face including means for fixing the cleaning and/or drying fluid transporting body, the second face of the support plate including a positioning and orientating interface for the first part of the cleaning and/or drying fluid transporting body and a locking interface for the second part of the cleaning and/or drying fluid transporting body, for the optical sensor of the motor vehicle.

12. The fixing device according to claim 11, further comprising on the second face of the support plate, a first positioning and orientating interface and a second locking interface which cooperate with the first guiding part and the second part of the cleaning and/or drying fluid transporting body.

13. A method of mounting the cleaning and/or drying fluid transporting body according to claim 6 of the telescopic cleaning device on the support plate for the optical sensor of the optical detection system of the motor vehicle, the support plate having a first face on the optical sensor side, and a second face located opposite to the first face and including means for fixing the cleaning and/or drying fluid transporting body, a second face of the support plate including a positioning and orientating interface for the first part of the cleaning and/or drying fluid transporting body and a locking interface for a second part of the cleaning and/or drying fluid transporting body, for an optical sensor of a motor vehicle, the method comprising:

- translating the cleaning and/or drying fluid transporting body toward the positioning and orientating interface of the support plate in order to make at least one cylindrical lug of the cleaning and/or drying fluid transporting body cooperate with a receiving rail of the positioning and orientating interface; and
- rotating the cleaning and/or drying fluid transporting body, about an axis of rotation defined by the at least one cylindrical lug, to allow snap-fit fixing means to be brought together and locked.

* * * * *